United States Patent
Koizumi et al.

(10) Patent No.: US 9,815,380 B2
(45) Date of Patent: Nov. 14, 2017

(54) POWER SUPPLY DEVICE, POWER RECEIVING DEVICE, AND CHARGING SYSTEM

(71) Applicant: PANASONIC INTELLECTUAL PROPERTY MANAGEMENT CO., LTD., Osaka (JP)

(72) Inventors: Masayoshi Koizumi, Kanagawa (JP); Osamu Ohashi, Kanagawa (JP); Tsuyoshi Nishio, Chiba (JP); Noriaki Asaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 14/779,115

(22) PCT Filed: Mar. 24, 2014

(86) PCT No.: PCT/JP2014/001674
§ 371 (c)(1),
(2) Date: Sep. 22, 2015

(87) PCT Pub. No.: WO2014/156106
PCT Pub. Date: Oct. 2, 2014

(65) Prior Publication Data
US 2016/0052405 A1   Feb. 25, 2016

(30) Foreign Application Priority Data
Mar. 27, 2013   (JP) ................................. 2013-066137

(51) Int. Cl.
*H02J 7/00*   (2006.01)
*B60L 11/18*  (2006.01)
(Continued)

(52) U.S. Cl.
CPC ......... *B60L 11/182* (2013.01); *B60L 11/1835* (2013.01); *H01M 10/42* (2013.01);
(Continued)

(58) Field of Classification Search
CPC .. H02J 5/005; H02J 7/025; H02J 50/10; H02J 50/80
(Continued)

(56) References Cited

U.S. PATENT DOCUMENTS

2008/0197804 A1   8/2008 Onishi et al.
2010/0244578 A1   9/2010 Yoshikawa
(Continued)

FOREIGN PATENT DOCUMENTS

EP   2 693 600 A1   2/2014
EP   2 985 869 A1   2/2016
(Continued)

OTHER PUBLICATIONS

Office Action issued in European Patent Application No. 14 774 031 dated Apr. 24, 2017.
(Continued)

*Primary Examiner* — Nathaniel Pelton
(74) *Attorney, Agent, or Firm* — Pearne & Gordon LLP

(57) ABSTRACT

Power supply device is provided with the following: a power supply unit (121) that includes a spiral coil or a solenoid coil; a frequency characteristic acquisition unit (211) that acquires the frequency characteristics of the efficiency of the supply of power from the power supply unit to the power receiving device; a peak determining unit (212) that determines peaks in the frequency characteristics of the efficiency of power supply; and a drive frequency determination unit (213) that, if two peaks have been found, determines as the drive frequency used for supplying power a frequency near the frequency that is the lower of the frequencies of the two peaks, with the lower frequency being given priority over a frequency near the higher frequency.

14 Claims, 12 Drawing Sheets

(51) Int. Cl.
  *H02J 7/02* (2016.01)
  *H01M 10/42* (2006.01)
  *H02J 5/00* (2016.01)
  *H02J 50/10* (2016.01)
  *H02J 50/80* (2016.01)

(52) U.S. Cl.
  CPC .............. *H02J 5/005* (2013.01); *H02J 7/025* (2013.01); *H02J 50/10* (2016.02); *H02J 50/80* (2016.02); *B60L 2270/147* (2013.01); *H01M 2250/20* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/32* (2013.01)

(58) Field of Classification Search
  USPC ........................................................ 320/108
  See application file for complete search history.

(56) References Cited

U.S. PATENT DOCUMENTS

| | | | |
|---|---|---|---|
| 2010/0244581 A1 | 9/2010 | Uchida | |
| 2010/0244839 A1* | 9/2010 | Yoshikawa | G01R 33/3642 324/318 |
| 2012/0080957 A1* | 4/2012 | Cooper | H02J 5/005 307/104 |
| 2012/0217819 A1 | 8/2012 | Yamakawa et al. | |
| 2013/0320759 A1* | 12/2013 | Abe | H01F 38/14 307/10.1 |
| 2014/0035386 A1 | 2/2014 | Hatanaka et al. | |
| 2014/0239728 A1* | 8/2014 | Yamakawa | B60L 11/182 307/104 |

FOREIGN PATENT DOCUMENTS

| | | | |
|---|---|---|---|
| JP | 2008-206232 A | | 9/2008 |
| JP | 2010-239816 A | | 10/2010 |
| JP | 2010-239838 A | | 10/2010 |
| JP | 2010-239847 A | | 10/2010 |
| JP | 2011-125184 A | | 6/2011 |
| JP | 2011125184 | * | 6/2011 |
| JP | 2011-142769 A | | 7/2011 |
| JP | 2012-175793 A | | 9/2012 |
| JP | 2012-222989 A | | 11/2012 |
| JP | 2013-017255 A | | 1/2013 |
| WO | 2012-132413 A1 | | 10/2012 |
| WO | 2012/157115 A1 | | 11/2012 |

OTHER PUBLICATIONS

International Search Report for Application No. PCT/JP2014/001674 dated Jun. 17, 2014.

European Search Report for Application No. 14 77 4031 dated May 17, 2016.

* cited by examiner

POWER SUPPLY DEVICE, POWER RECEIVING DEVICE, AND CHARGING SYSTEM

TECHNICAL FIELD

The present invention relates to a power supply apparatus provided on a ground side, a power receiving apparatus provided on a vehicle that receives power supplied from the power supply apparatus using an electromagnetic force in a wireless manner, and a charging system including these apparatuses.

BACKGROUND ART

In recent years, automobiles running on electric power such as an electric vehicle (EV), a plug-in hybrid electric vehicle (PHEV), and a hybrid electric vehicle (HEV) (hereinafter simply referred to as "vehicle" or "vehicles") have become widespread. Such vehicles are mounted with a large capacity storage battery, store electric energy supplied from outside in a storage battery and run using the stored electric energy.

As a method of supplying power to a storage battery of a vehicle from the outside, a method is known whereby power is supplied between a primary side coil of a power supply apparatus provided on a ground side and a secondary side coil of a power receiving apparatus provided on a vehicle side using an electromagnetic force in a wireless manner. According to this wireless power supply method, it is known that a frequency characteristic for efficiency of power supply (hereinafter, referred to as "power supply efficiency") when an inter-coil coupling coefficient is high is a double hump characteristic having two peaks (resonance points) (e.g., see PTL 1). In wireless power supply for vehicles in particular, the shape of double hump characteristic varies depending on a gap, displacement and battery condition, and the peak positions may also constantly change, and so it is necessary to check these changes every time.

Patent Literature (hereinafter, referred to as "PTL") 1 discloses a technique of sequentially changing a frequency of power to be sent from a power transmission coil, detecting a frequency characteristic of power received by a power receiving coil, and transmitting power using a frequency corresponding to maximum received power.

CITATION LIST

Patent Literature

PTL 1
Japanese Patent Application Laid-Open No. 2011-142769

SUMMARY OF INVENTION

Technical Problem

When the aforementioned frequency characteristic of power supply efficiency has two peaks, and when power is supplied using frequencies at a peak on a high-frequency side and a peak on a low-frequency side, magnetic fields formed between the coils are known to have different shapes. When power supply from a primary side coil on the ground to a secondary side coil provided on a bottom surface of the vehicle is considered, a magnetic flux in the horizontal direction with respect to the ground may become unnecessary radiation. For this reason, suppression of radiation of the horizontal direction component of the magnetic flux with respect to the ground makes it possible to reduce unnecessary radiation leaking out of the vehicle.

However, the wireless power supply method disclosed in aforementioned PTL 1 selects a frequency to obtain high power supply efficiency, and PTL 1 neither discloses nor suggests which peak frequency should be used when the same power supply efficiency is obtained at two peaks.

An object of the present invention is to provide a power supply apparatus, a power receiving apparatus and a charging system that suppress radiation of a horizontal direction component of a magnetic flux with respect to the ground.

Solution to Problem

A power supply apparatus according to an aspect of the present invention is to be disposed on a ground side and supplies power using an electromagnetic force to a power receiving apparatus disposed on a vehicle, the power supply apparatus including: a power supply section including a spiral coil or a solenoid coil; a frequency characteristic acquiring section that acquires a frequency characteristic for efficiency of power supply performed from the power supply section to the power receiving apparatus; a peak determining section that determines a peak in the frequency characteristic for the efficiency of power supply; and a drive frequency determining section that determines, when two peaks are determined, a frequency in the vicinity of a lower frequency of frequencies at the two peaks to be a drive frequency preferentially over a frequency in the vicinity of a higher frequency, the drive frequency being used for the power supply.

A power receiving apparatus according to an aspect of the present invention is to be disposed on a vehicle and that receives power supplied using an electromagnetic force from the power supply apparatus according to claim 1 to be disposed on a ground side, the power receiving apparatus comprising a power receiving section including a spiral coil or solenoid coil that receives the power supplied from the power supply apparatus.

A charging system according to an aspect of the present invention includes: a power supply apparatus to be disposed on a ground side; and a power receiving apparatus that is to be disposed on a vehicle and that receives power supplied from the power supply apparatus using an electromagnetic force, in which the power receiving apparatus includes: a power receiving section including a spiral coil or solenoid coil that receives the power supplied from the power supply apparatus; and a storage battery that stores the power received by the power receiving section, and the power supply apparatus includes: a power supply section that includes a spiral coil or solenoid coil; a frequency characteristic acquiring section that acquires a frequency characteristic for efficiency of power supply performed from the power supply section to the power receiving section; a peak determining section that determines a peak in the frequency characteristic for the efficiency of power supply; and a drive frequency determining section that determines, when two peaks are determined, a frequency in the vicinity of a lower frequency of frequencies at the two peaks to be a drive frequency preferentially over a frequency in the vicinity of a higher frequency, the drive frequency being used for the power supply.

Advantageous Effects of Invention

According to the present invention, it is possible to suppress radiation of a horizontal direction component with respect to the ground.

DESCRIPTION OF EMBODIMENTS

Hereinafter, embodiments of the present invention will be described in detail with reference to the accompanying drawings.

(Embodiment 1)
<Configuration of Charging System>

Figure 1:
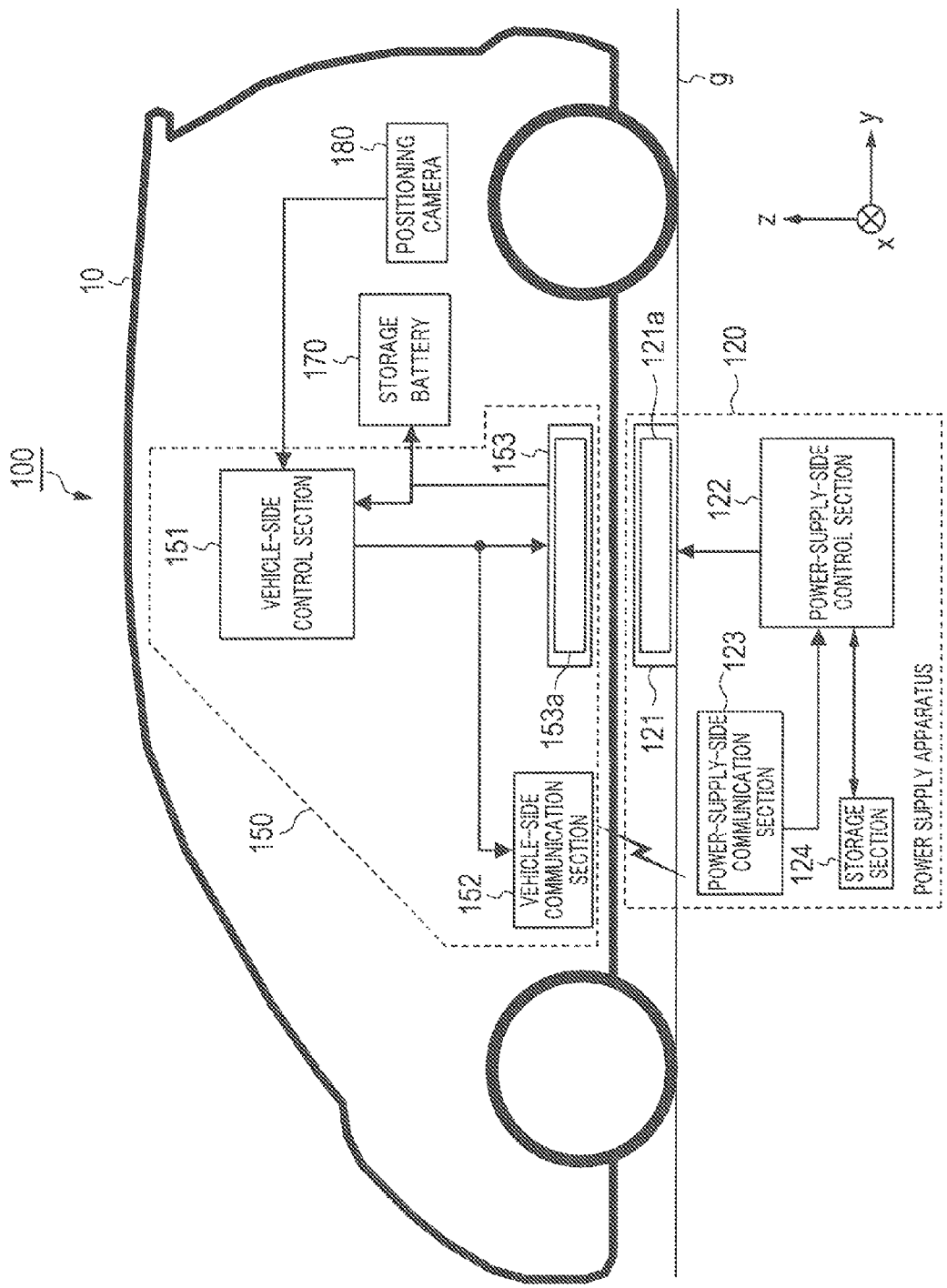
FIG. 1 is a block diagram illustrating a configuration of a charging system according to Embodiment 1 of the present invention.

A configuration of charging system 100 according to Embodiment 1 of the present invention will be described using FIG. 1.

Charging system 100 includes power supply apparatus 120 and vehicle 10. Note that FIG. 1 illustrates a state in which power supply coil 121a and power receiving coil 153a are placed opposite to each other and power can be supplied.

Power supply apparatus 120 is installed on or buried in the ground so that power supply section 121 is exposed from the surface of ground g. Power supply apparatus 120 is provided, for example, in a parking space, and faces power receiving section 153 and supplies power to power receiving apparatus 153 while vehicle 10 is parked. Here, the term "power supply" refers to supplying power from power supply coil 121a to power receiving coil 153a. The power supply is classified into power supply to acquire a frequency characteristic for power supply efficiency while sequentially changing the frequency before supplying power to storage battery 170 (hereinafter described as "test power supply") and power supply to supply power to storage battery 170 with greater power than that of the test power supply (hereinafter, described as "full-scale power supply"). Note that the term simply described as "power supply" in the following description includes both the test power supply and the full-scale power supply. The configuration of power supply apparatus 120 will be described later.

Vehicle 10 includes power receiving apparatus 150, storage battery 170 and positioning camera 180, and runs using storage battery 170 as a power source. Vehicle 10 is a vehicle that runs on power of storage battery 170 such as a hybrid electric vehicle (HEV), a plug-in hybrid electric vehicle (PHEV) or an electric vehicle (EV).

<Configuration of Power Receiving Apparatus>

Power receiving apparatus 150 supplies power which is supplied from power supply apparatus 120 to storage battery 170.

Storage battery 170 stores the power supplied from power receiving apparatus 150.

Positioning camera 180 captures an image of the outside of vehicle 10, reads a marker placed in the vicinity of power supply apparatus 120 and outputs the read image to vehicle-side control section 151.

Power receiving apparatus 150 includes vehicle-side control section 151, vehicle-side communication section 152 and power receiving section 153.

Vehicle-side control section 151 determines whether power supply section 121 and power receiving section 153 are positioned facing each other based on the image outputted from positioning camera 180. When power supply section 121 and power receiving section 153 are positioned facing each other (aligned with each other), and a charging start instruction is received from an input section (not shown), vehicle-side control section 151 controls vehicle-side communication section 152 and power receiving section 153 so as to perform various types of processes associated with the charging start. Moreover, vehicle-side control section 151 detects power received by power receiving coil 153a and outputs the received power detection result to vehicle-side communication section 152 as received power information. Upon receiving a charging stop instruction from an input section (not shown), vehicle-side control section 151 controls vehicle-side communication section 152 and power receiving section 153 so as to perform various kinds of processes associated with the charging stop.

Vehicle-side communication section 152 transmits the received power information outputted from vehicle-side control section 151 to power-supply-side communication section 123. Vehicle-side communication section 152 generates a power-supply-start signal or power-supply-stop signal under the control of vehicle-side control section 151 and transmits the generated power-supply-start signal or power-supply-stop signal to power-supply-side communication section 123.

Power receiving section 153 includes power receiving coil 153a (secondary coil) on the bottom surface of vehicle 10. Power receiving coil 153a is a planar spiral coil, receives power transmitted from power supply section 121 under the control of vehicle-side control section 151 and supplies the received power to storage battery 170. Power receiving section 153 is provided while being exposed to the outside at the bottom of vehicle 10.

<Configuration of Power Supply Apparatus>

Power supply apparatus 120 includes power supply section 121, power-supply-side control section 122, power-supply-side communication section 123 and storage section 124.

When supplying power to power receiving section 153 of power receiving apparatus 150, power supply section 121 faces power receiving section 153 in a wireless manner. Power supply section 121 includes power supply coil 121a (primary coil) and power supply coil 121a is a planar spiral coil. Power supply section 121 performs test power supply from power supply coil 121a while sequentially changing the frequency under the control of power-supply-side control section 122 and performs full-scale power supply at a determined drive frequency. This power supply is performed under, for example, an electromagnetic induction scheme, an electric field resonance scheme or a magnetic field resonance scheme.

When a power-supply-start signal is outputted from power-supply-side communication section 123, power-supply-side control section 122 controls power supply section 121 so as to perform test power supply with respect to power receiving coil 153a while sequentially changing the frequency for power supply coil 121a. Power-supply-side control section 122 calculates power supply efficiency for each frequency based on the supplied power subject to the test power supply from power supply coil 121a and received power information received from power-supply-side communication section 101 and causes storage section 124 to store the calculated power supply efficiency. Power-supply-side control section 122 selects a frequency corresponding to a peak where the power supply efficiency reaches a local maximum based on the power supply efficiency for each frequency stored in storage section 124 and controls power supply section 121 so as to start full-scale power supply using the selected frequency. Power-supply-side control section 122 also controls power supply section 121 to stop power supply according to a power-supply-stop signal received from power-supply-side communication section 123.

Power-supply-side communication section 123 receives the received power information transmitted from vehicle-side communication section 152 and outputs the received power information to power-supply-side control section 122. Power-supply-side communication section 123 receives a power-supply-start signal or a power-supply-stop signal from vehicle-side communication section 152 and outputs the received power-supply-start signal or power-supply-stop signal to power-supply-side control section 122.

Storage section 124 stores the power supply efficiency for each frequency outputted from power-supply-side control section 122.

<Detailed Configuration of Power Supply Apparatus>

Figure 2:
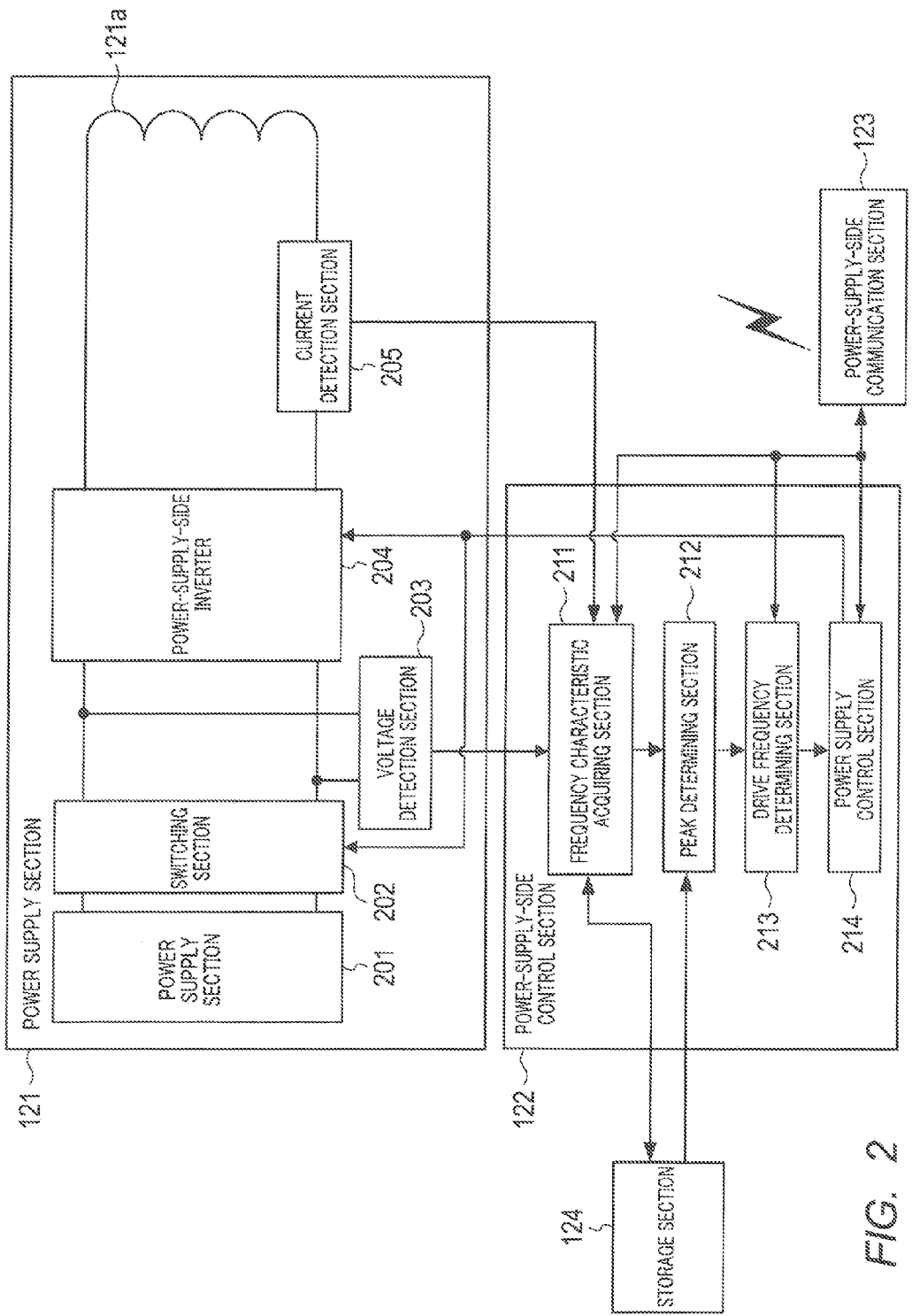
FIG. 2 is a block diagram illustrating an internal configuration of the power supply apparatus shown in FIG. 1.

Next, more detailed configurations of power supply section 121 and power-supply-side control section 122 in the internal configuration of power supply apparatus 120 will be described. FIG. 2 is a block diagram illustrating the internal configuration of power supply apparatus 120 shown in FIG. 1.

Power supply section 121 includes power supply section 201, switching section 202, voltage detection section 203, power-supply-side inverter 204, current detection section 205 and power supply coil 121a.

Power supply section 201 supplies DC power with a predetermined voltage and current to power-supply-side inverter 204 via switching section 202.

Switching section 202 opens and/or closes connection between power supply section 201 and inverter 203 under the control of power supply control section 214.

Voltage detection section 203 detects a voltage value of DC power supplied from power supply section 201 to power-supply-side inverter 204 and outputs the detected voltage value to frequency characteristic acquiring section 211.

When performing test power supply, power-supply-side inverter 204 converts DC power supplied from power supply section 201 to AC power while sequentially changing the frequency under the control of power supply control section 214 and supplies the AC power to power supply coil 121a. On the other hand, when performing full-scale power supply, power-supply-side inverter 204 converts DC power supplied from power supply section 201 to AC power under the control of power supply control section 214 and supplies the AC power to power supply coil 121a.

Current detection section 205 detects a current value of the AC power supplied from power-supply-side inverter 204 to power supply coil 121a and outputs the detected current value to frequency characteristic acquiring section 211.

Power supply coil 121a receives supply of AC power from power-supply-side inverter 204, thereby supplying power to power receiving coil 153a.

Note that, although voltage detection section 203 is provided between power supply section 201 and power-supply-side inverter 204, voltage detection section 203 may be provided between power-supply-side inverter 204 and power supply coil 121a. Although current detection section 205 is provided between power-supply-side inverter 204 and power supply coil 121a, current detection section 205 may also be provided between power supply section 201 and power-supply-side inverter 204.

Power-supply-side control section 122 includes frequency characteristic acquiring section 211, peak determining section 212, drive frequency determining section 213 and power supply control section 214.

Frequency characteristic acquiring section 211 sequentially calculates supplied power in the test power supply according to the voltage value outputted form voltage detection section 203 and the current value outputted from current detection section 205. Frequency characteristic acquiring section 211 sequentially calculates power supply efficiency based on the calculated supplied power and the received power information outputted from power-supply-side communication section 123, causing storage section 124 to store the calculated power supply efficiency, and sequentially outputting the power supply efficiency to peak determining section 212. Note that, the frequency characteristic acquiring method will be described later in more details.

Peak determining section 212 performs a peak determining process in a power supply efficiency frequency characteristic based on the result of a comparison between the power supply efficiency stored in storage section 124 that is calculated earlier than the last time and the power supply efficiency of this time that is outputted from frequency characteristic acquiring section 211. Peak determining section 212 outputs the peak determining result to drive frequency determining section 213. Note that details of the peak determining method will be described later.

When a power-supply-start signal is outputted from power-supply-side communication section 123, drive frequency determining section 213 outputs a start value and an end value of a preset frequency and a step value to change the frequency to power supply control section 214. Among the frequencies at two peaks shown in the peak determining result outputted from peak determining section 212, drive frequency determining section 213 determines one with a lower frequency as a drive frequency for full-scale power supply and notifies power supply control section 214 of the determined drive frequency.

When a power-supply-start signal is outputted from power-supply-side communication section 123, power supply control section 214 closes switching section 202 and causes power supply section 201 to be connected to inverter 203 to start test power supply, and controls power-supply-side inverter 204 so as to change the frequency of AC power supplied to power supply coil 121a using the start value, end value and step value of the frequency outputted from drive frequency determining section 213. When a drive frequency for full-scale power supply is outputted from drive frequency determining section 213, power supply control section 214 keeps switching section 202 closed, keeps power supply section 201 connected to power-supply-side inverter 204 and controls power-supply-side inverter 204 so as to change an AC power frequency supplied to power supply coil 121a based on the drive frequency.

After starting power supply, when a power-supply-stop signal is outputted from power-supply-side communication section 123, power supply control section 214 opens switching section 202 and causes power supply section 201 to be disconnected from power-supply-side inverter 204.

<Arrangement of Coil>

Figure 3C:
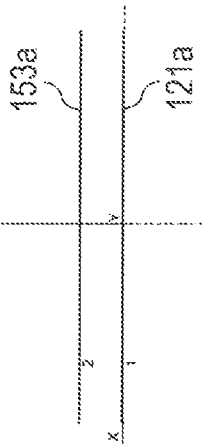
FIGS. 3A to 3D are diagrams illustrating a coil arrangement of the power supply section and the power receiving section shown in FIG. 1.
Figure 3B:
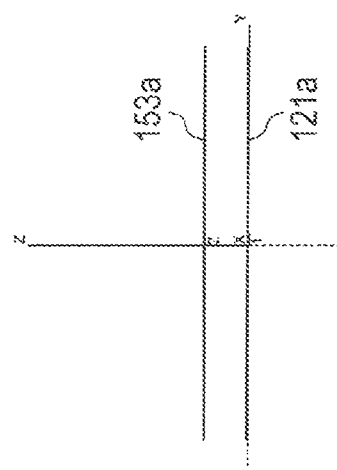
Figure 3D:
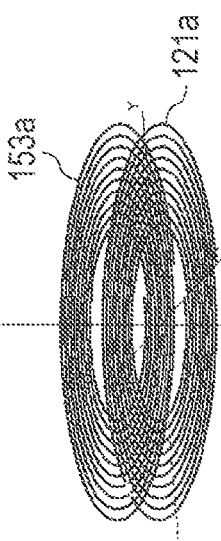
Figure 3A:
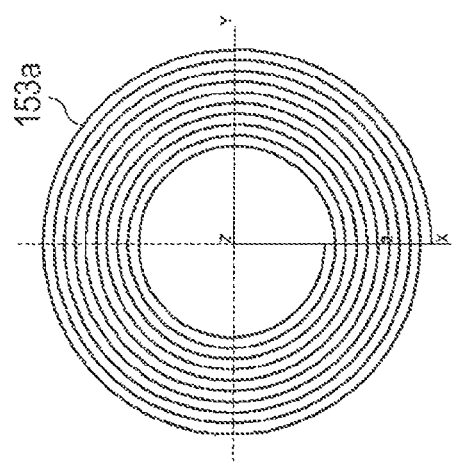

Next, an arrangement of aforementioned power supply coil 121a and power receiving coil 153a will be described using FIGS. 3A to 3D. FIGS. 3A to 3D illustrate a state in which power supply coil 121a is aligned with power receiving coil 153a. The x-axis represents a lateral direction of vehicle 10 (+x direction indicating the right direction of vehicle 10, −x direction indicating the left direction of vehicle 10), the y-axis represents a longitudinal direction of vehicle 10 (+y direction indicating the backward direction of vehicle 10, the −y direction indicating the forward direction of vehicle 10), and the z-axis represents a vertical direction with respect to the ground (+z direction indicating the upward direction of vehicle 10, the −z direction indicating the downward direction of vehicle 10). FIG. 3A, FIG. 3B and FIG. 3C illustrate an xy plane, a yz plane and an xz plane respectively. FIG. 3D illustrates a perspective view of power supply coil 121a and power receiving coil 153a.

Thus, planar spiral coils are used for power supply coil 121a and power receiving coil 153a respectively and the spiral coils are arranged so that the respective planar surfaces become parallel to the surface of ground g.

<Operation of Power Supply Apparatus>

Figure 4:
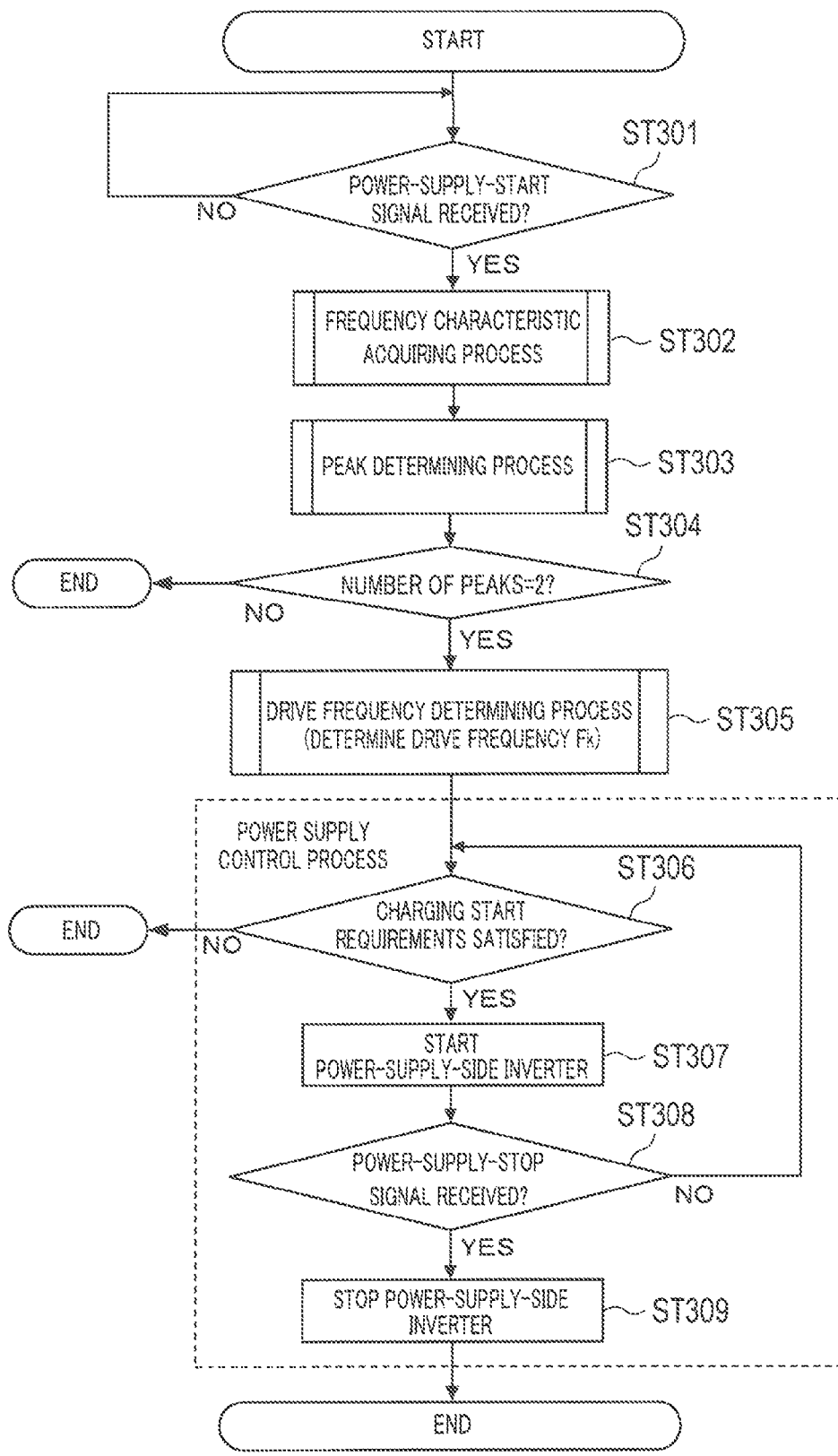
FIG. 4 is a flowchart illustrating an operation of the power supply apparatus shown in FIG. 1.

Next, an operation of aforementioned power supply apparatus 120 will be described using FIG. 4.

In step (hereinafter abbreviated as "ST") 301, power-supply-side communication section 123 of power supply apparatus 120 determines whether or not a power-supply-start signal has been received from vehicle-side communication section 152, and proceeds to ST302 when a power-supply-start signal has been received (YES) or repeats the process in ST301 when no power-supply-start signal has been received (NO).

In ST302, frequency characteristic acquiring section 211 performs a process of acquiring a frequency characteristic for power supply efficiency. Note that details of the frequency characteristic acquiring method will be described later.

In ST303, peak determining section 212 performs a peak determining process based on the power supply efficiency stored in storage section 124 calculated earlier than the last time and power supply efficiency this time acquired from frequency characteristic acquiring section 211. Note that details of the peak determining method will be described later.

In ST304, peak determining section 212 determines whether or not two peaks appear in the power supply efficiency frequency characteristic, and proceeds to ST305 when two peaks appear (YES) or ends the operation of power supply apparatus 120 when two peaks do not appear (NO).

In ST305, drive frequency determining section 213 determines the lower frequency of the frequencies at the two peaks determined by peak determining section 212 as drive frequency Fk for full-scale power supply. Note that details of the drive frequency determining method will be described later.

In ST306, power supply control section 214 determines whether or not the charging start requirements are satisfied. Here, the "charging start requirements" refer to detection of a displacement between the engaging coils, leakage detection, equipment search, equipment authentication, detection of foreign substance between the coils or the like, and suppose the charging start requirements are satisfied when there is no abnormality in the requirements. When the charging start requirements are satisfied (YES), the process proceeds to ST307 or when the charging start requirements are not satisfied (NO), the operation of power supply apparatus 120 is ended.

In ST307, power supply control section 214 starts power-supply-side inverter 204 based on drive frequency Fk for full-scale power supply and determines in ST308 whether or not power-supply-side communication section 123 has received a power-supply-stop signal from vehicle-side communication section 152. Power supply control section 214 proceeds to ST309 when a power-supply-stop signal has been received (YES) or returns to ST306 when no power-supply-stop signal has been received (NO).

In ST309, power supply control section 214 stops power-supply-side inverter 204 and ends the operation of power supply apparatus 120.

<Frequency Characteristic Acquiring Method>

Next, the aforementioned frequency characteristic acquiring method will be described using FIG. 5.

In ST401, drive frequency determining section 213 sets start value Fa, end value Fb and step value Fs of drive frequency F for test power supply, and in ST402, power supply control section 214 sets start value Fa as drive frequency F.

In ST403, power supply control section 214 starts power-supply-side inverter 204 at drive frequency F and predetermined power Ws. Here, since predetermined power Ws is power in test power supply, Ws is power lower than supplied power in full-scale power supply. In ST404, frequency characteristic acquiring section 211 receives received power information on received power Wj from vehicle-side communication section 152 via power-supply-side communication section 123.

In ST405, frequency characteristic acquiring section 211 calculates power supply efficiency η based on predetermined power (supplied power) Ws and power receiving power Wj received in ST404. For example, frequency characteristic acquiring section 211 divides received power Wj by predetermined power Ws (Wj/Ws) to calculate power supply efficiency η. Frequency characteristic acquiring section 211 causes storage section 124 to store calculated power supply efficiency η together with drive frequency F.

In ST406, power supply control section 214 adds step value Fs to drive frequency F, and power supply control section 214 determines, in ST407, whether or not drive frequency F is equal to or higher than end value Fb. When drive frequency F is equal to or higher than end value Fb (YES), power supply control section 214 proceeds to ST408 or returns to ST403 when drive frequency F is less than end value Fb (NO).

In ST408, power supply control section 214 opens switching section 202, causes power supply section 201 to be disconnected from power-supply-side inverter 204, stops power-supply-side inverter 204 and ends the frequency characteristic process.

Figure 5:
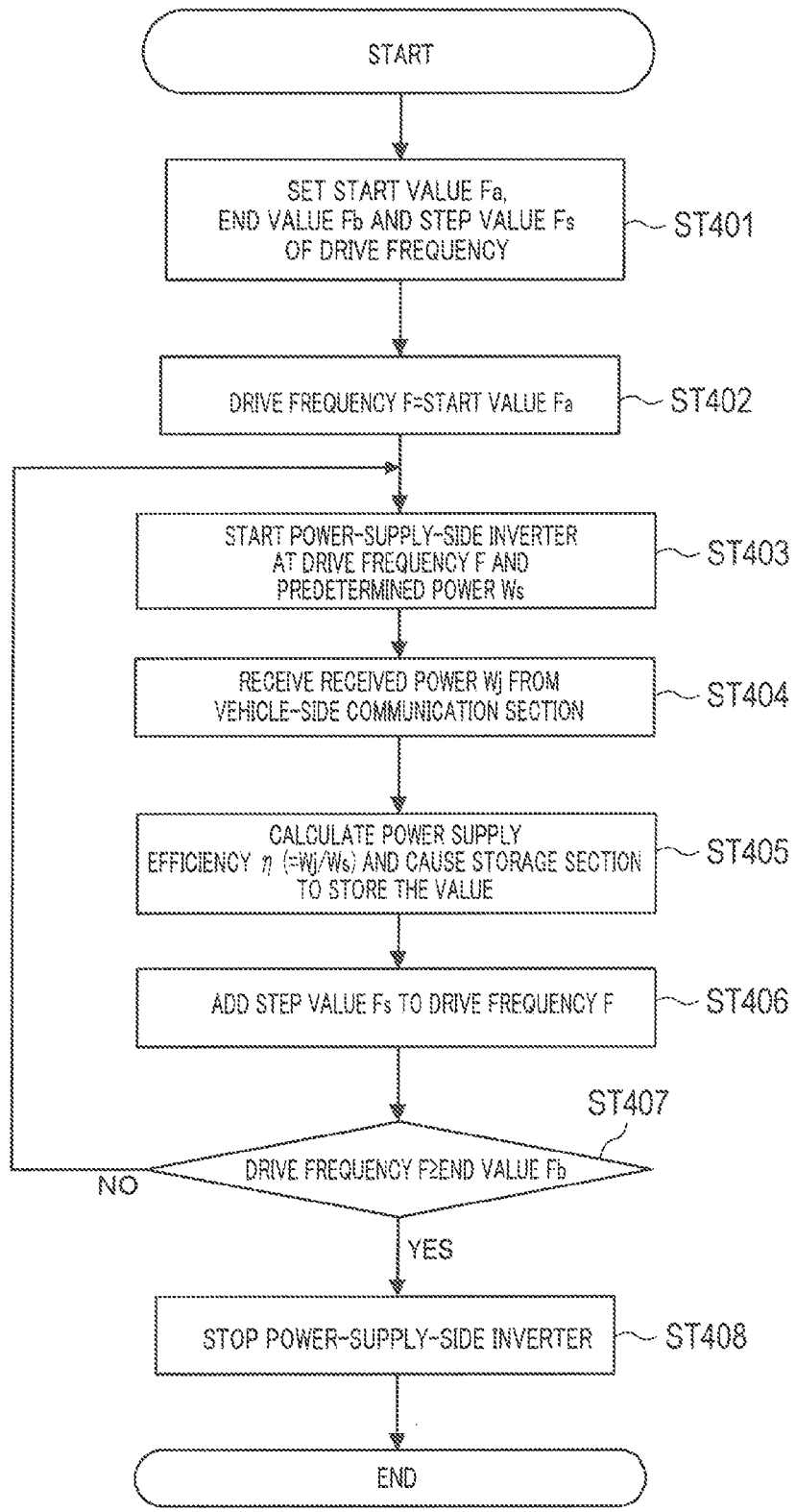
FIG. 5 is a flowchart illustrating a procedure of the frequency characteristic acquiring process shown in FIG. 4.

Note that in FIG. 5, in ST406, step value Fs is added to drive frequency F by setting end value Fb to a higher frequency side than start value Fa, but step value Fs may be subtracted from drive frequency F in ST406 by setting end value Fb to a lower frequency side than start value Fa. Alternatively, drive frequency F may be increased or decreased. Furthermore, the pitch width of step value Fs may be an irregular interval instead of a regular interval.

<Peak Determining Method>

Figure 6:
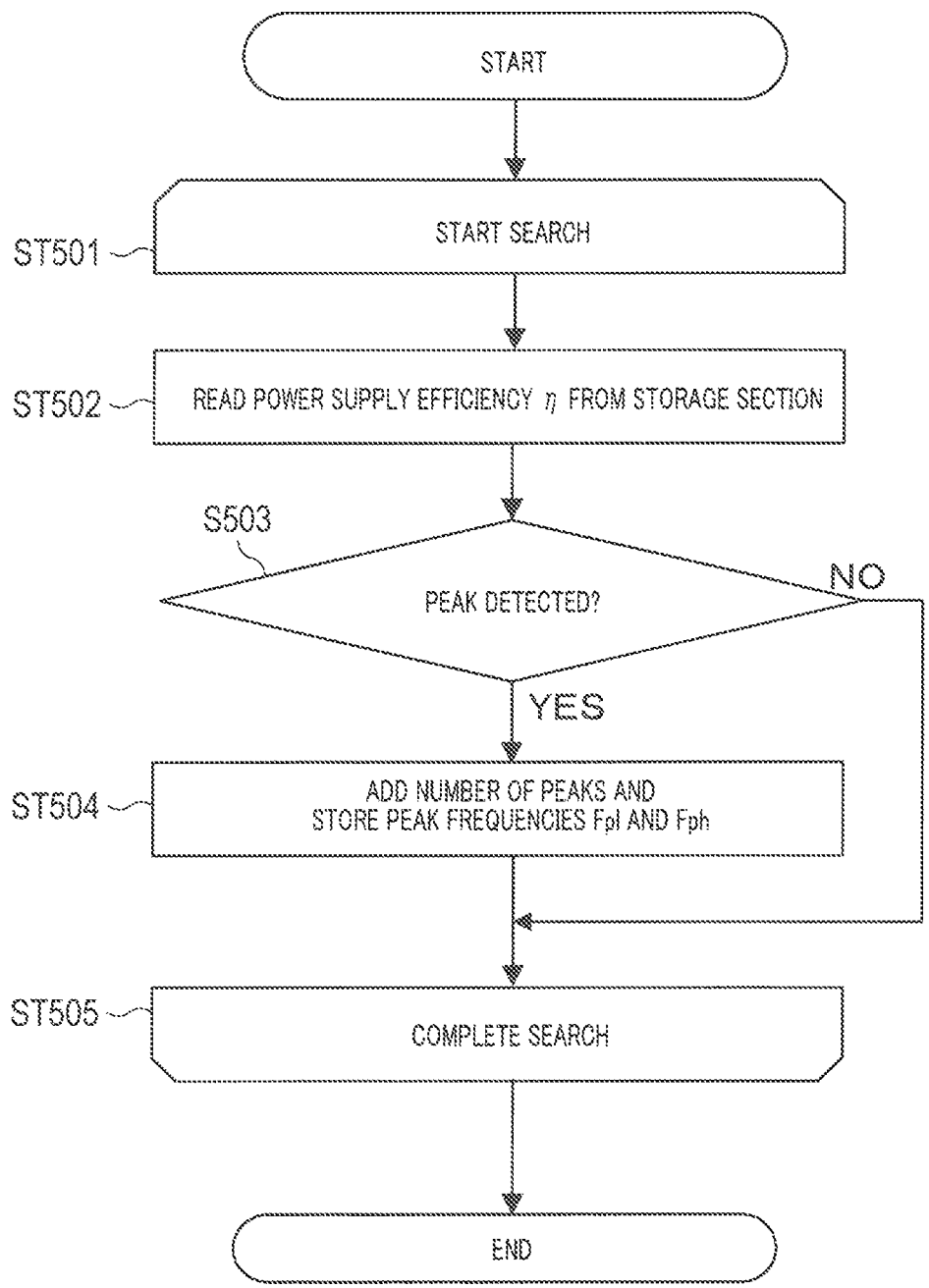
FIG. 6 is a flowchart illustrating a procedure of the peak determining process shown in FIG. 4.

Next, the aforementioned peak determining method will be described using FIG. 6.

The peak determining process is performed using the frequency characteristic for power supply efficiency that is acquired by the aforementioned frequency characteristic acquiring method.

In ST501, peak determining section 212 starts a search, and reads, in ST502, power supply efficiency η earlier than the last time stored in storage section 124.

In ST503, peak determining section 212 determines whether or not a peak is detected. For example, when power supply efficiency calculated last time is higher than power supply efficiency calculated the time before the last time and power supply efficiency calculated this time is lower than power supply efficiency calculated last time, peak determining section 212 determines that the power supply efficiency is at a peak. Peak determining section 212 proceeds to ST504 upon determining that a peak is detected (YES), or ends the search upon determining that no peak is detected (NO) (step ST505).

In ST504, peak detection section 212 adds "1" as the number of peaks and causes storage section 124 to store frequency Fpl at which the power supply efficiency reaches a peak. Note that when a second peak is detected in the repetition process in ST501 to ST505, frequency Fph (where, Fpl<Fph is assumed) is stored in storage section 124 and the search is ended (step ST505).

Note that in the peak determining process, the search in ST501 to ST505 is performed in the same range as the range of the frequency when a frequency characteristic is acquired or in a range narrower than that.

Thus, in the peak determining process, peak determining section 212 selects a frequency at a peak at which the power supply efficiency reaches a local maximum. Note that the frequency characteristic acquiring process and the peak determining process may be performed simultaneously.

Figure 7:
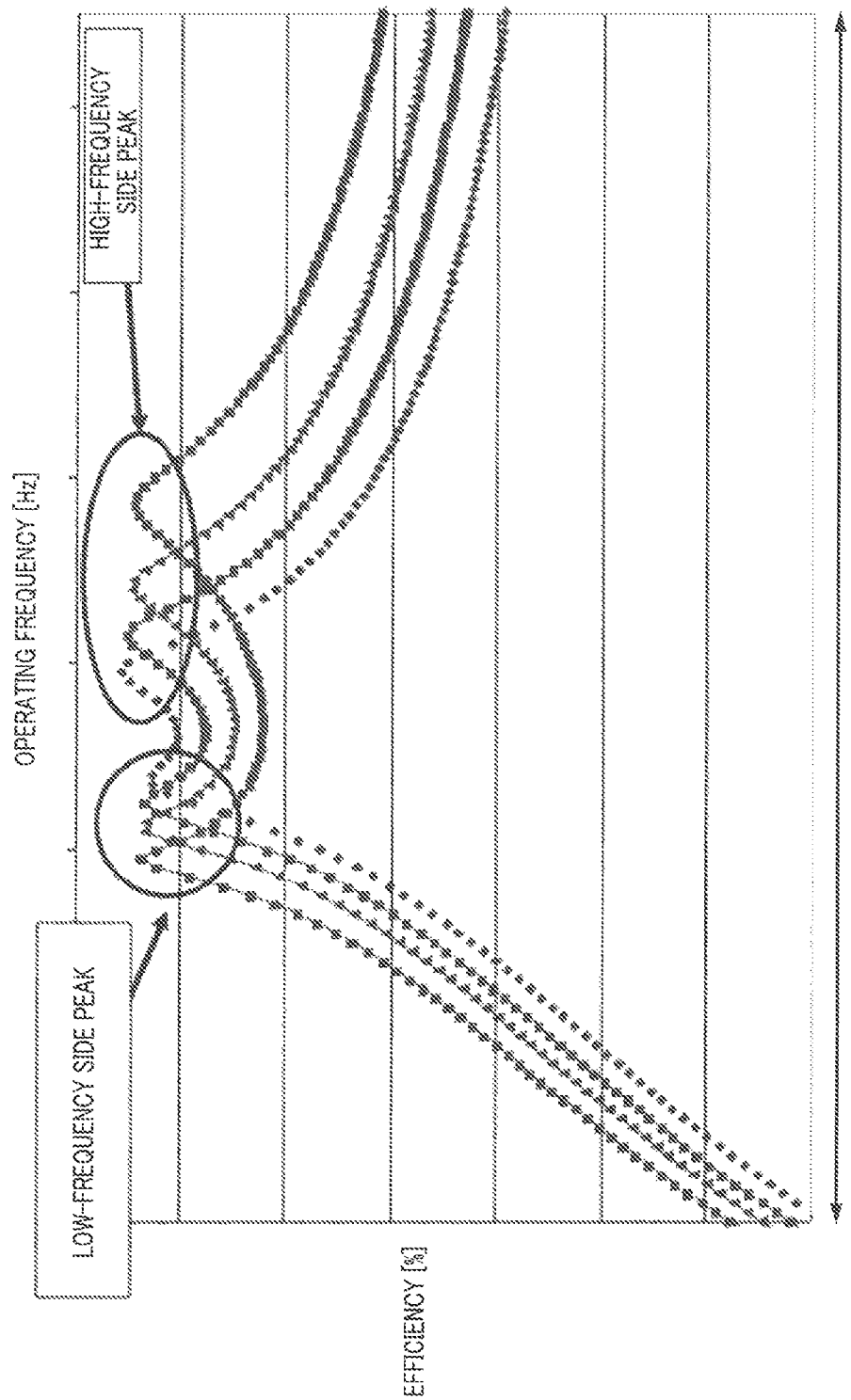
FIG. 7 is a diagram provided for describing how a frequency characteristic over an entire operating frequency is acquired.

Here, FIG. 7 illustrates a situation in which a frequency characteristic is acquired over the entire operating frequency. In FIG. 7, peaks are detected in areas enclosed by a circle and an ellipse. Note that FIG. 7 illustrates four frequency characteristics which differ depending on a gap, a positional displacement or a battery condition.

<Drive Frequency Determining Method>

Figure 8:
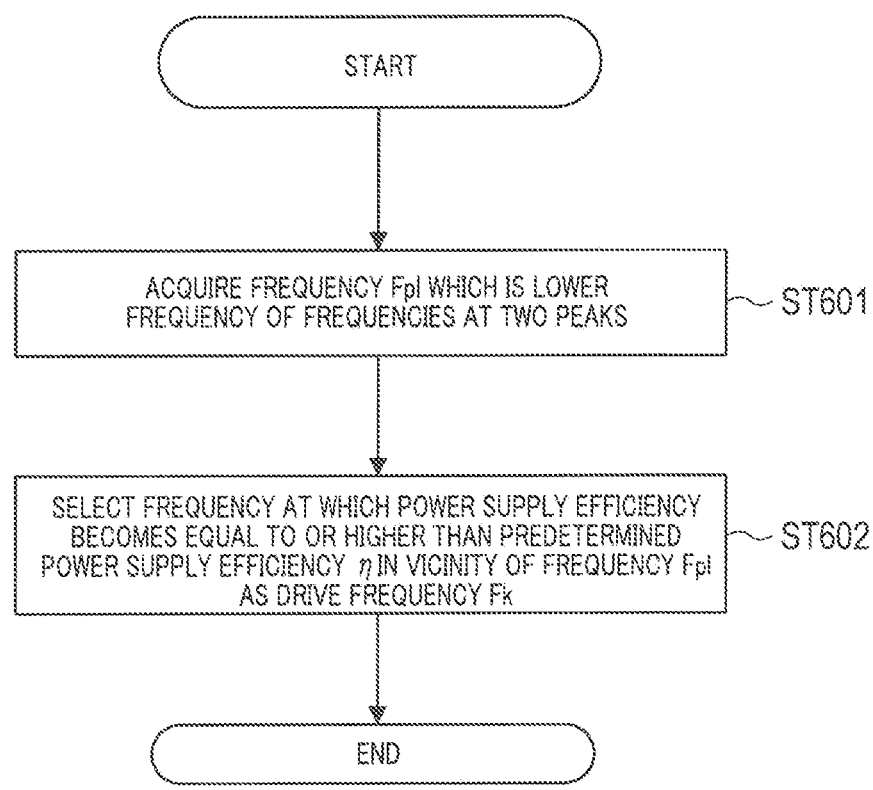
FIG. 8 is a flowchart illustrating a procedure of the drive frequency determining process shown in FIG. 4.

Next, the aforementioned drive frequency determining method will be described using FIG. 8.

In ST601, drive frequency determining section 213 acquires frequency Fpl which is the lower frequency at the two peaks determined by peak determining section 212.

In ST602, drive frequency determining section 213 determines the frequency where the power supply efficiency becomes equal to or higher than predetermined power supply efficiency η in the vicinity of frequency Fpl as drive frequency Fk for full-scale power supply. Here, drive frequency Fk is assumed to be frequency Fpl or in the vicinity of frequency Fpl.

Figure 9:
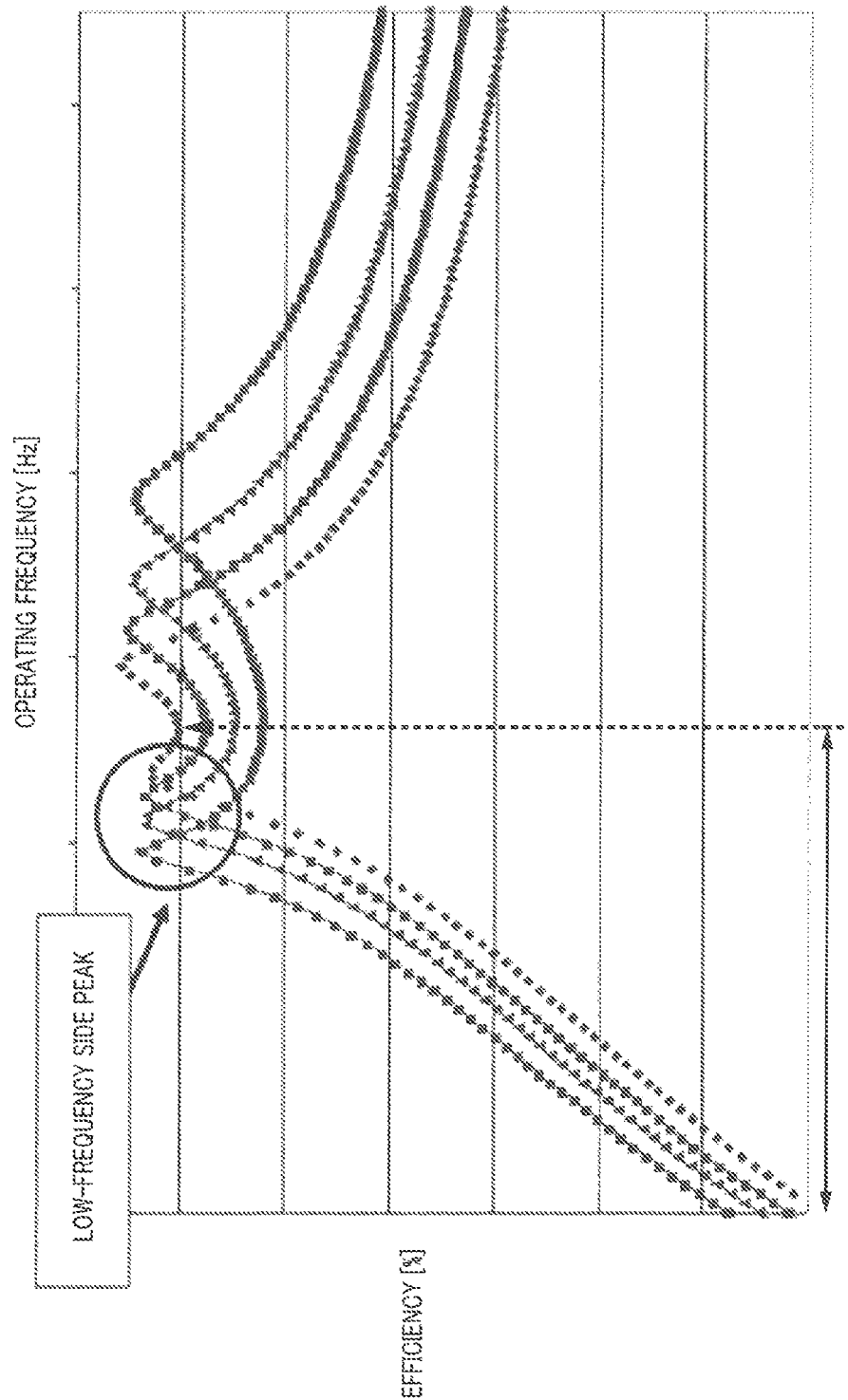
FIG. 9 is a diagram provided for describing how a frequency characteristic on a low-frequency side of an operating frequency is acquired.

Thus, drive frequency determining section 213 determines the lower frequency of the frequencies at the two peaks as drive frequency Fk. On the other hand, a frequency corresponding to a local minimum value located between peaks (value taken when the function reaches a local minimum) never changes depending on conditions. From this, the frequency characteristic acquiring process may be performed within a range equal to or lower than a frequency of a valley shape region in the frequency characteristic acquiring process. FIG. 9 illustrates this situation. It is thereby possible to shorten the time required to obtain a frequency characteristic.

<Direction of Magnetic Flux>

Figure 10B:
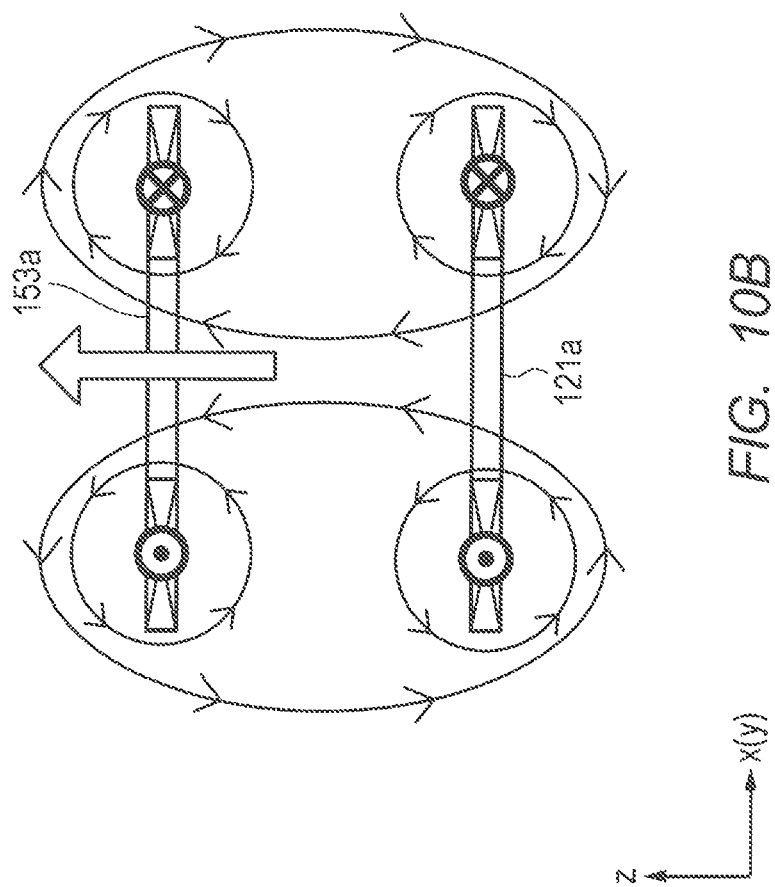
FIGS. 10A and 10B are conceptual diagrams illustrating a magnetic field shape formed between a power supply coil and a power receiving coil.
Figure 10A:
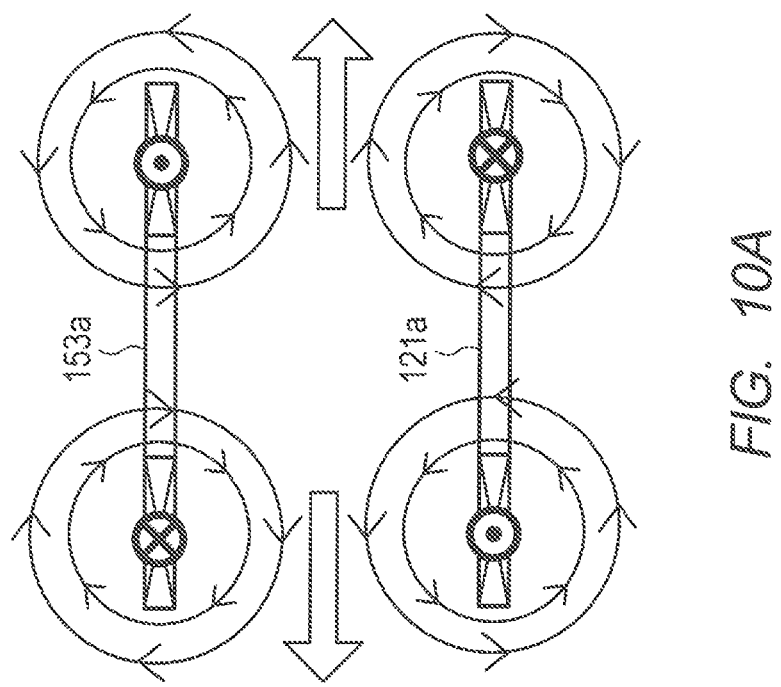

FIGS. 10A and 10B are conceptual diagrams each illustrating magnetic field shapes formed between power supply coil 121*a* and power receiving coil 153*a* when frequencies at two peaks are used. These diagrams illustrate the yz plane or xz plane shown in FIG. 3. FIG. 10A illustrates a magnetic field shape when the higher frequency of those at the two peaks and FIG. 10B illustrates a magnetic field shape when the lower frequency of those at the two peaks.

It is clear from FIG. 10A that a magnetic flux (thick arrows in the diagram) is in the horizontal direction and it is clear from FIG. 10B that a magnetic flux (thick arrow in the diagram) is in the +z direction, that is, the direction of vehicle 10. Thus, using the lower frequency causes the magnetic flux to be directed toward vehicle 10, and can thereby prevent unnecessary radiation from leaking outside.

<Effects of Embodiment>

Thus, charging system 100 according to Embodiment 1 uses planar spiral coils for power supply coil 121*a* and power receiving coil 153*a* respectively and performs full-scale power supply using a lower frequency or a frequency in the vicinity thereof among the frequencies at two peaks where power supply efficiency reaches a local maximum that are obtained from a frequency characteristic for power supply efficiency at a position where these coils are placed opposite to each other. Thus, it is possible to direct the magnetic flux formed between power supply coil 121*a* and power receiving coil 153*a* toward the vehicle 10 and thus to suppress unnecessary radiation.

Embodiment 2

In Embodiment 1, the case has been described where power supply efficiency is calculated when the frequency characteristic is acquired as shown in FIG. 5. In Embodiment 2 of the present invention, a case will be described where a current value of power supply coil 121*a* is detected while the voltage of power supply coil 121*a* is kept constant and the frequency characteristic of the current value is acquired. Note that since a configuration of a charging system according to Embodiment 2 of the present invention is similar to the configuration shown in FIG. 1 and FIG. 2 of Embodiment 1, only functions different from those in Embodiment 1 will be described using FIG. 1 and FIG. 2.

<Frequency Characteristic Acquiring Method>

Figure 11:
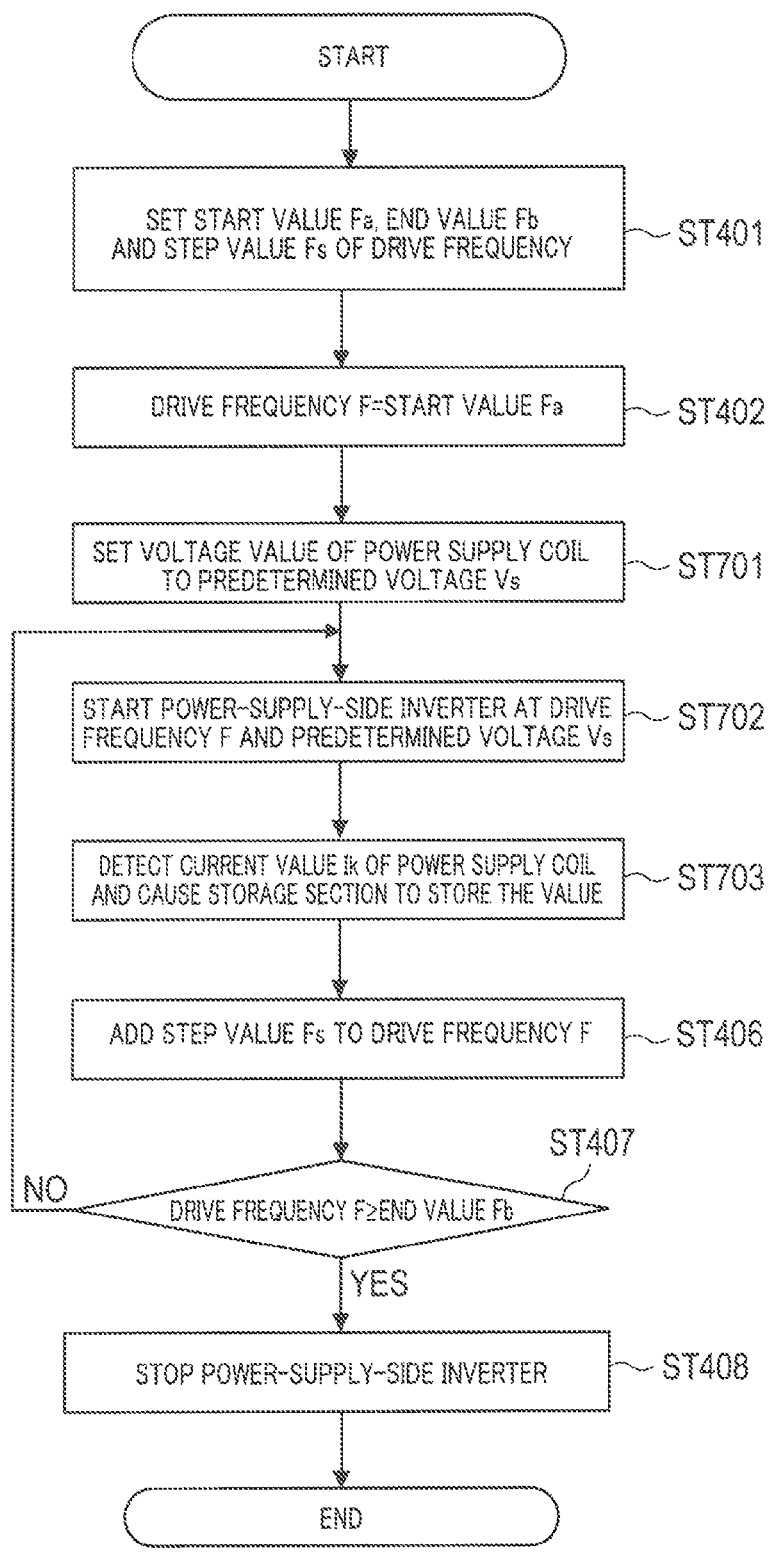
FIG. 11 is a flowchart illustrating a procedure of a frequency characteristic acquiring process according to Embodiment 1 of the present invention.

A frequency characteristic acquiring method according to Embodiment 2 of the present invention will be described using FIG. 11. Note that in FIG. 11, the processes identical to those in FIG. 5 will be assigned identical reference numerals and a duplicate description thereof will be omitted.

In ST701, power supply control section 214 sets a voltage value of power supply coil 121*a* to predetermined voltage Vs. Here, predetermined voltage Vs is a voltage in test power supply, so that it may be lower than a voltage in full-scale power supply.

In ST702, power supply control section 214 starts power-supply-side inverter 204 at drive frequency F and predetermined voltage Vs, and frequency characteristic acquiring section 211 detects, in ST703, current value Ik of power supply coil 121a and causes storage section 124 to store detected current value Ik together with drive frequency F.

Thus, when the voltage of power supply coil 121a is set to be constant, the present embodiment takes advantage of the fact that the current of power supply coil 121a has a frequency characteristic similar to the power supply efficiency.

Note that although the voltage of power supply coil 121a is set to be constant in the present embodiment, the current of power supply coil 121a may be set to be constant so that a voltage value of power supply coil 121a is detected. In this case, the voltage of power supply coil 121a has a frequency characteristic similar to the power supply efficiency as well. Without being limited to these methods, any method may be adopted as long as a frequency characteristic for the power supply efficiency can be acquired with the method.

Note that the case has been described in the embodiments where a lower frequency is used for the entire drive time, but the present invention is not limited to this. For example, a lower frequency may be used for a time period equal to or longer than half the entire drive time and a higher frequency may be used for the remaining time period. In other words, the lower frequency may be used preferentially over the higher frequency.

Figure 12A:
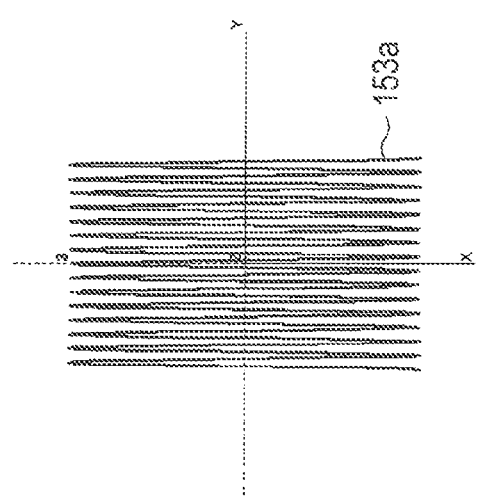
FIGS. 12A to 12D are diagrams illustrating a coil arrangement when a solenoid coil is used for the power supply section and the power receiving section.
Figure 12B:
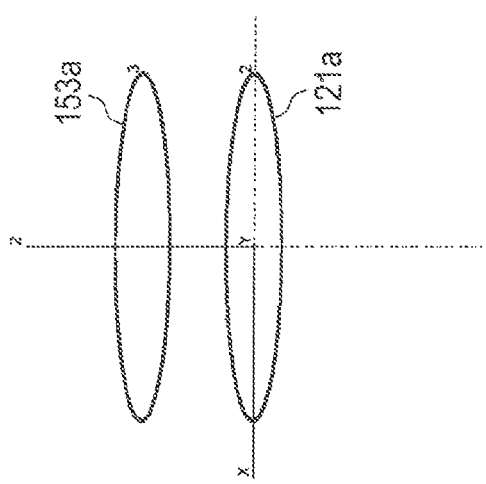
Figure 12C:
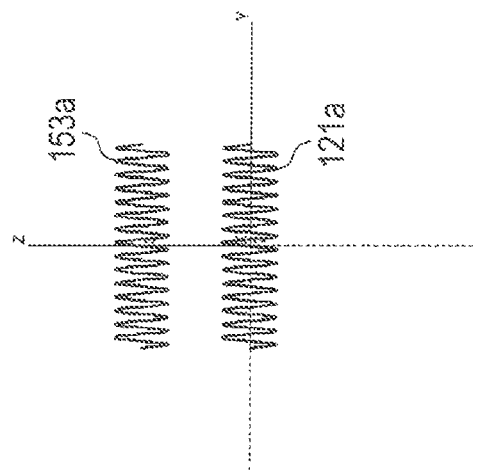
Figure 12D:
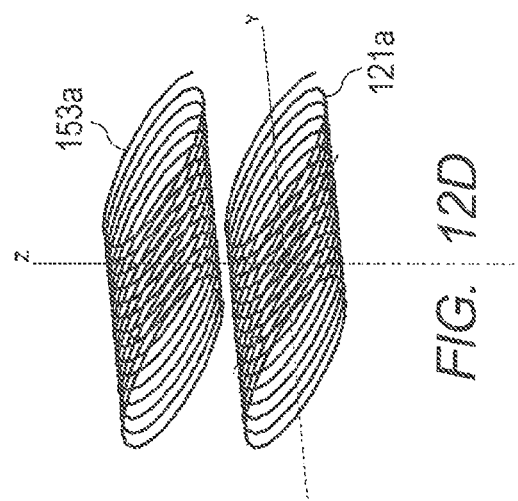

A case has been described in the embodiments where a planar spiral coil is used. However, the present invention is not limited to this, and a solenoid coil as shown in FIGS. 12A to 12D may be used. FIGS. 12A to 12D as well as FIG. 3 illustrate a state in which alignment is made between power supply coil SC and power receiving coil RC. FIGS. 12A, 12B and 12C illustrate the xy, xz and yz planes, respectively. FIG. 12D illustrates a perspective view of power supply coil SC and power receiving coil RC. Thus, the solenoid coils used for power supply coil SC and power receiving coil RC respectively are arranged with the respective central axes placed parallel to the surface of ground g.

The case has been described in the embodiments where power supply apparatus 120 includes storage section 124. However, the present invention is not limited to this, and power supply apparatus 120 may not include storage section 124. In this case, power-supply-side control section 122 changes drive frequency F, stops changing drive frequency F when the current value, voltage value, efficiency, and coil current phase difference reach predetermined values, and the frequency at this time is assumed to be a drive frequency.

Drive frequency Fk may be determined based on a phase difference between currents flowing through the primary side coil and the secondary side coil. When the current flowing through the primary side coil is in-phase with the current flowing through the secondary side coil, both the spiral coil and the solenoid coil are driven at a peak on the low-frequency side, whereas when they are in opposite phases, both coils are driven at a peak on the high-frequency side. For this reason, when both currents become in-phase while the frequency is changed from a certain value, the change of drive frequency F is stopped and the frequency at this time is assumed to be drive frequency Fk.

When drive frequency Fk is determined according to a phase difference between the currents flowing through the primary side coil and the secondary side coil, current detection section 205 detects the phase of the current flowing through power supply coil 121a and vehicle-side control section 151 detects the phase of the current flowing through power receiving coil 153a. Furthermore, the peak determining process in peak determining section 212 "reads a coil current phase difference" in ST502 of FIG. 6 and reads this, in ST503, as "determine whether or not the read coil current phase difference is in-phase." As a result, drive frequency determining section 213 determines the frequency at which the coil current phase difference becomes in-phase to be drive frequency Fk.

The disclosure of Japanese Patent Application No. 2013-066137, filed on Mar. 27, 2013, including the specification, drawings and abstract is incorporated herein by reference in its entirety.

INDUSTRIAL APPLICABILITY

The power supply apparatus, the power receiving apparatus and the charging system according to the present invention are useful in suppressing radiation of a horizontal direction component with respect to the surface of the ground.

REFERENCE SIGNS LIST

10 Vehicle
120 Power supply apparatus
121 Power supply section
121a Power supply coil
122 Power-supply-side control section
123 Power-supply-side communication section
124 Storage section
150 Power receiving apparatus
151 Vehicle-side control section
152 Vehicle-side communication section
153 Power receiving section
153a Power receiving coil
170 Storage battery
180 Positioning camera
201 Power supply section
202 Switching section
203 Voltage detection section
204 Power-supply-side inverter
205 Current detection section
211 Frequency characteristic acquiring section
212 Peak determining section
213 Drive frequency determining section
214 Power supply control section

The invention claimed is:

1. A power supply apparatus configured to be disposed on a ground side and configured to supply power using an electromagnetic force to a power receiving apparatus configured to be disposed on a vehicle, the power supply apparatus comprising:
a coil,
wherein the power supply apparatus provides power to the coil with frequencies to detect a peak of efficiency of power supply performed from the coil to the power receiving apparatus, the frequencies sweeping between a first frequency and a second frequency which is higher than the first frequency,
after the power supply apparatus detects the peak of the efficiency of the power supply, the power supply apparatus provides power to the coil with a third frequency corresponding to the peak of the efficiency of the power supply, and wherein the second frequency corresponds to a single local minimum value of the efficiency of the power supply, located between two peaks of the efficiency of the power supply.

2. The power supply apparatus according to claim 1, wherein
a pair of the power supply apparatus and the power receiving apparatus from the start has the local minimum value of the efficiency of the power supply, located between the two peaks of the efficiency of the power supply.

3. The power supply apparatus according to claim 1, wherein
the power supply apparatus performs the power supply using a constant voltage, and
acquires a frequency characteristic of a current value of the supplied power as the frequency characteristic for the efficiency of the power supply.

4. The power supply apparatus according to claim 1, wherein
the power supply apparatus performs the power supply using a constant current, and
acquires a frequency characteristic of a voltage value of the supplied power as the frequency characteristic for the efficiency of the power supply.

5. The power supply apparatus according to claim 1, wherein the power supply apparatus performs test power supply that supplies power to the power receiving apparatus while sequentially changing a frequency in order for the power supply apparatus to acquire the frequency characteristic for the efficiency of the power supply.

6. The power supply apparatus according to claim 5, wherein the power supply apparatus performs the test power supply in a range equal to or lower than a predetermined frequency representing a local minimum value between the two peaks.

7. The power supply apparatus according to claim 1, wherein the coil is disposed so that a central axis of winding of the coil is perpendicular to the surface of the ground.

8. The power supply apparatus according to claim 1, wherein the coil is disposed so that a central axis of winding of the coil is parallel to the surface of the ground.

9. The power supply apparatus according to claim 1, wherein the power supply apparatus determines a frequency shifted by a predetermined value from the lower frequency of the frequencies at the two peaks to be the drive frequency.

10. The power supply apparatus according to claim 1, wherein the power supply apparatus determines a frequency at which a current flowing through the power receiving coil becomes in-phase with a current flowing through the power supply coil to be the drive frequency, preferentially over a frequency at which the phase is reversed.

11. A power receiving apparatus that is to be disposed on a vehicle and that receives power supplied using an electromagnetic force from the power supply apparatus according to claim 1 to be disposed on a ground side, the power receiving apparatus comprising a power receiving section including a spiral coil or solenoid coil that receives the power supplied from the power supply apparatus.

12. The power receiving apparatus according to claim 11, wherein the spiral coil is disposed so that a central axis of winding of the spiral coil is perpendicular to the surface of the ground.

13. The power receiving apparatus according to claim 11, wherein the solenoid coil is disposed so that a central axis of winding of the solenoid coil is parallel to the surface of the ground.

14. A charging system comprising:
a power supply apparatus to be disposed on a ground side; and
a power receiving apparatus that is to be disposed on a vehicle and that receives power supplied from the power supply apparatus using an electromagnetic force, wherein
the power receiving apparatus includes:
a power receiving section including a spiral coil or solenoid coil that receives the power supplied from the power supply apparatus; and
a storage battery that stores the power received by the power receiving section, and
the power supply apparatus includes:
a coil,
wherein the power supply apparatus provides power to the coil with frequencies to detect a peak of efficiency of power supply performed from the coil to the power receiving apparatus, the frequencies sweeping between a first frequency and a second frequency which is higher than the first frequency,
after the power supply apparatus detects the peak of the efficiency of the power supply, the power supply apparatus provides power to the coil with a third frequency corresponding to the peak of the efficiency of the power supply, and
wherein the second frequency corresponds to a single local minimum value of the efficiency of the power supply, located between two peaks of the efficiency of the power supply.

* * * * *